US010141704B2

(12) United States Patent
Boyd, Jr. et al.

(10) Patent No.: US 10,141,704 B2
(45) Date of Patent: Nov. 27, 2018

(54) CONNECTOR RELEASE TOOL

(71) Applicants: Ronald E. Boyd, Jr., Chichester, NH (US); Kim Albright, Warner, NH (US)

(72) Inventors: Ronald E. Boyd, Jr., Chichester, NH (US); Kim Albright, Warner, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 763 days.

(21) Appl. No.: 13/969,022

(22) Filed: Aug. 16, 2013

(65) Prior Publication Data

US 2015/0047183 A1 Feb. 19, 2015

(51) Int. Cl.
*B23P 19/00* (2006.01)
*H01R 43/22* (2006.01)
*H01R 4/48* (2006.01)

(52) U.S. Cl.
CPC ........... *H01R 43/22* (2013.01); *H01R 4/4827* (2013.01); *Y10T 29/53283* (2015.01)

(58) Field of Classification Search
CPC .......................... H01R 43/22; Y10T 29/53283
USPC .............................................................. 29/764
See application file for complete search history.

(56) References Cited

U.S. PATENT DOCUMENTS

| | | | | |
|---|---|---|---|---|
| 4,392,301 | A * | 7/1983 | Hannes et al. | 29/741 |
| 4,433,477 | A * | 2/1984 | Karga et al. | 29/764 |
| 4,800,647 | A * | 1/1989 | Guyer | 29/741 |
| 5,230,143 | A * | 7/1993 | Karlovich | 29/764 |
| 5,351,391 | A * | 10/1994 | Doutrich et al. | 29/728 |
| 5,479,669 | A * | 1/1996 | Chen | 7/107 |
| 6,634,096 | B1 * | 10/2003 | Yamamoto et al. | 29/764 |
| 7,275,313 | B2 * | 10/2007 | Ichida et al. | 29/747 |
| 7,534,128 | B2 * | 5/2009 | Caveney et al. | 439/480 |
| 2003/0229979 | A1 * | 12/2003 | Kappel et al. | 29/426.6 |
| 2005/0060878 | A1 * | 3/2005 | Hasircoglu et al. | 29/764 |
| 2009/0178265 | A1 * | 7/2009 | Wojcik et al. | 29/426.5 |
| 2015/0047183 | A1 * | 2/2015 | Boyd et al. | 29/764 |

* cited by examiner

*Primary Examiner* — Paul D Kim
(74) *Attorney, Agent, or Firm* — Edward S. Podszus

(57) ABSTRACT

A connector release tool (100) includes a shaft (102) having a proximal end (104) defining a handle (106) and an operative distal end (108) defining a shroud portion (110). The shroud portion (110) includes sidewalls (112) extending away from the distal end (108) and terminating at a datum surface (114) and a channel (116) defined therebetween. The shroud portion (110) further includes a plurality of contact pins (118) extending away from the distal end (108) and into the channel (116) of the shroud portion (110), each contact pin (118) adapted to engage an associated push-button connector of a terminal block (20) and allow removal of one or more wires (24) coupled to the terminal block (20).

7 Claims, 7 Drawing Sheets

CONNECTOR RELEASE TOOL

CROSS REFERENCE TO RELATED APPLICATIONS

N/A

TECHNICAL FIELD

The present disclosure relates generally to a tool, and, more particularly, to a release tool for a multi-wire terminal block connector.

BACKGROUND

FIG. 1 illustrates a perspective view of a prior art operating tool, such as one commercially available from the WAGO Corporation (Germantown, Wis.) and used for use with terminal blocks. The operating tool 10 includes a shaft 12 having a proximal end 14 generally defining the handle portion and an operative distal end 16 for engaging a terminal block 20, such as one commercially available from the WAGO Corp. and designated as the "Surface Mount Terminal Block with Push-Buttons" 2060 series having Cage Clamps® connections for wire conductors. As shown, the terminal block 20 is mounted to a printed circuit board (PCB) 18 and includes multiple ports 22 for insertion of wire conductors 24, wherein push-button connectors 26 are configured to retain the wire conductors 24 within associated ports 22. Upon application of a force upon a push-button 26 by the operative distal end 16 of the operating tool 10, as indicated by arrow 28, the push-button 26 is depressed and thereby releases a wire conductor 24 from the associated port 22 and allows removal of the wire conductor 24, as indicated by arrow 30. The operating tool 10 may further be coated in electrical insulating material.

In some applications, PCBs can be interconnected with one another via terminal blocks 20. For example, in the lighting industry, multiple PCB-based LED modules in luminaires and/or signs may be coupled to one another by way of the associated terminal blocks. In particular, two PCBs having terminal blocks, similar to the terminal block 20 illustrated in FIG. 1, may be coupled to one another by way of two wire conductors connected between the terminal blocks. In the illustrated embodiment, the terminal block 20 is a 2-pole design. However, it should be noted that the terminal block may include more or less than 2 ports (e.g. 1-pole, 3-pole, n-pole). Accordingly, two wire conductors may be used to connect two PCBs to one another.

In some instances, the wire conductors may be relatively short in length and may be rigid due to size (length and/or gauge), which may present difficulty when attempting to decouple PCBs from one another (such as when repairing or reworking a luminaire). For example, when using the operating tool 10, a user may only release one wire at a time. However, although one of the push-button connectors may be depressed, the wire conductor is unable to sufficiently flex due to rigidity and/or insufficient length to allow at least one of the two wires to be removed at a time. This may cause frustration for the user and they may attempt to bend the PCBs away from each other, which may cause damage to the wire conductors and/or terminal block. Accordingly, in some instances, it is desirable to be able to simultaneously depress multiple push-buttons of the terminal block so as to allow simultaneous release of the wire conductors so as to prevent damage.

BRIEF DESCRIPTION OF THE DRAWINGS

Reference should be made to the following detailed description which should be read in conjunction with the following figures, wherein like numerals represent like parts.

Figure 1:
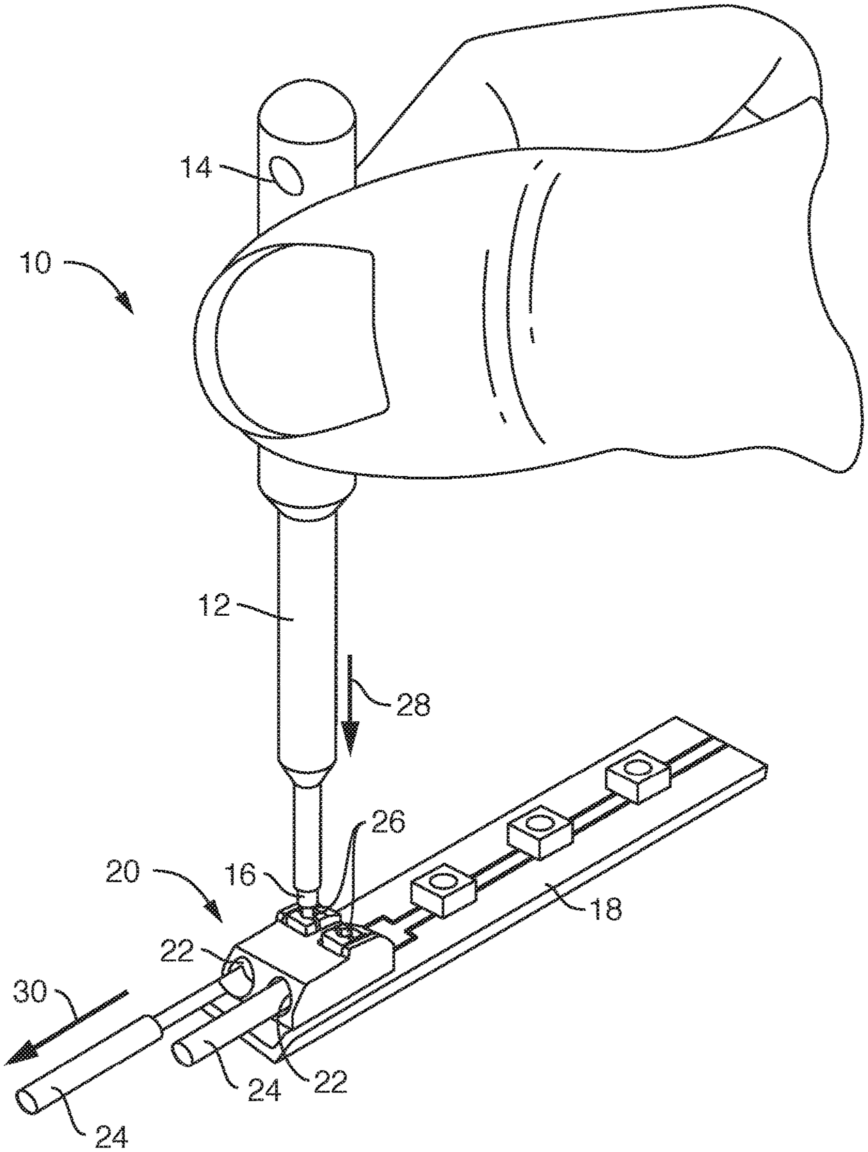
FIG. 1 PRIOR ART
FIG. 1 illustrates a perspective view of a prior art operating tool engaging a push-button connectors of a surface-mount terminal block for releasing wires coupled thereto.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient. Also, it should be understood that the phraseology and terminology used herein is for the purpose of description and should not be regarded as limiting.

DETAILED DESCRIPTION

In general, the present disclosure is directed to a release tool for a multi-wire terminal block connector. The release tool includes a shaft having a proximal end defining a handle portion and an operative distal end adapted to engage a terminal block and allow removal of one or more wires coupled to the terminal block. In particular, the distal end includes a shroud portion having sidewalls extending away from the distal end and terminating at a datum surface and a channel defined therebetween. The shroud portion also includes a plurality of contact pins extending away from the distal end and into the channel of the shroud portion. Each of the plurality of contact pins defines a tip portion positioned within the channel and a distance from the datum surface of the sidewalls. Furthermore, the tip portions are adapted to contact associated push-button connectors of the terminal block.

The shroud portion is shaped and/or sized to align each of the contact pins with the associated push-button connectors of the terminal block. Upon application of a force towards the terminal block, each contact pin engages and depresses the associated push-button connector to allow removal of corresponding wires conductors coupled thereto. Additionally, as the push-button connectors are depressed, the datum surface of the sidewalls eventually abuts a substrate (e.g.

PCB) on which the terminal block is mounted and restricts overall movement of the tool in relation to the terminal block.

In some embodiments, the shaft of the connector release tool may include a lateral clearance portion along a longitudinal length thereof. The lateral clearance portion is shaped and/or sized to provide clearance for one or more components surrounding a terminal block and/or the PCB to which it is mounted. Accordingly, the lateral clearance portion may allow the user to engage the terminal block to release wire conductors without having to necessarily remove components that may otherwise be blocking direct access to the terminal block. Additionally, in some embodiments, at least a portion of the tool, such as the shaft, including the handle portion, may be coated in an electrical insulating material.

A connector release tool consistent with the present disclosure provides a means of aligning contact pins with associated push-button connectors of a terminal block and allows a user to simultaneously depress the push-button connectors, thereby allowing the simultaneous release of wire conductors coupled to the terminal block. Furthermore, a positive stop defined by the distance between the tip portions of the contact pins and the datum surface of the sidewalls provides a means restricting the movement of the connector release tool, particularly movement of the tool when depressing push-button connectors of a terminal block. In particular, the positive stop allows the push-buttons to be sufficiently depressed by the contact pins (i.e. sufficient to release contact connection with associated wire conductor) without being over depressed, thereby preventing a user from applying excess downward pressure on the terminal block and push-button connectors and causing damage.

Figure 2:
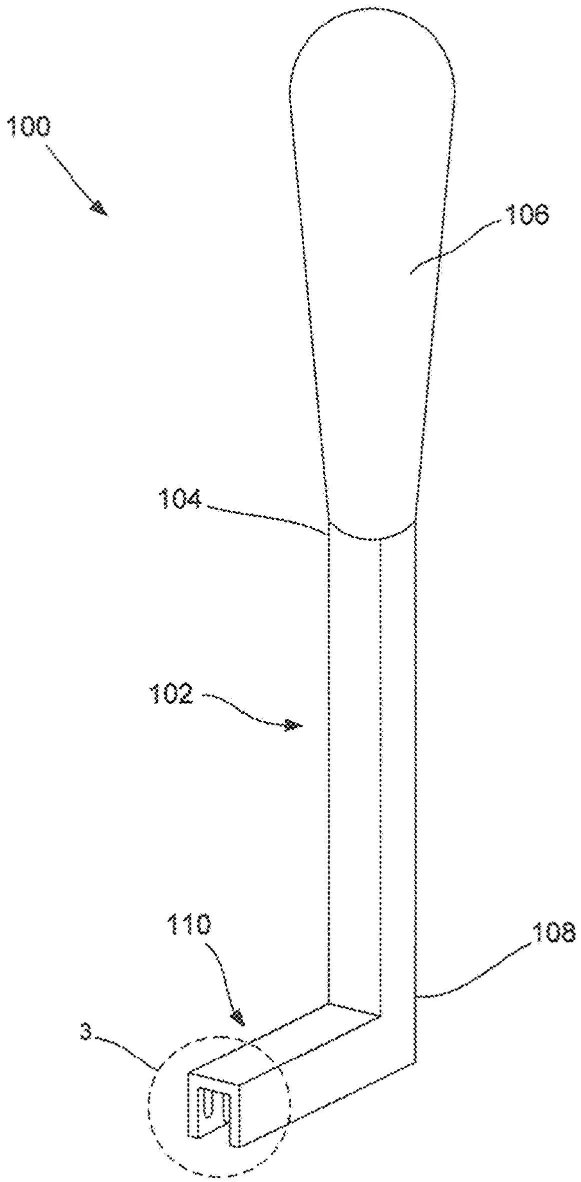
FIG. 2 illustrates a perspective view of a connector release tool consistent with the present disclosure.

Turning now to the drawings, FIG. 2 illustrates a perspective view of a connector release tool 100 consistent with the present disclosure. As shown, the tool 100 includes a shaft 102 having a proximal end 104 defining a handle portion 106 and an operative distal end 108. The operative distal end 108 includes a shroud portion 110 adapted to engage a terminal block connector, such as the surface-mount terminal block connector 20 shown in FIG. 1, and allow removal of one or more wire conductors 24 coupled to the terminal block 20, as described in greater detail herein.

Figure 3:
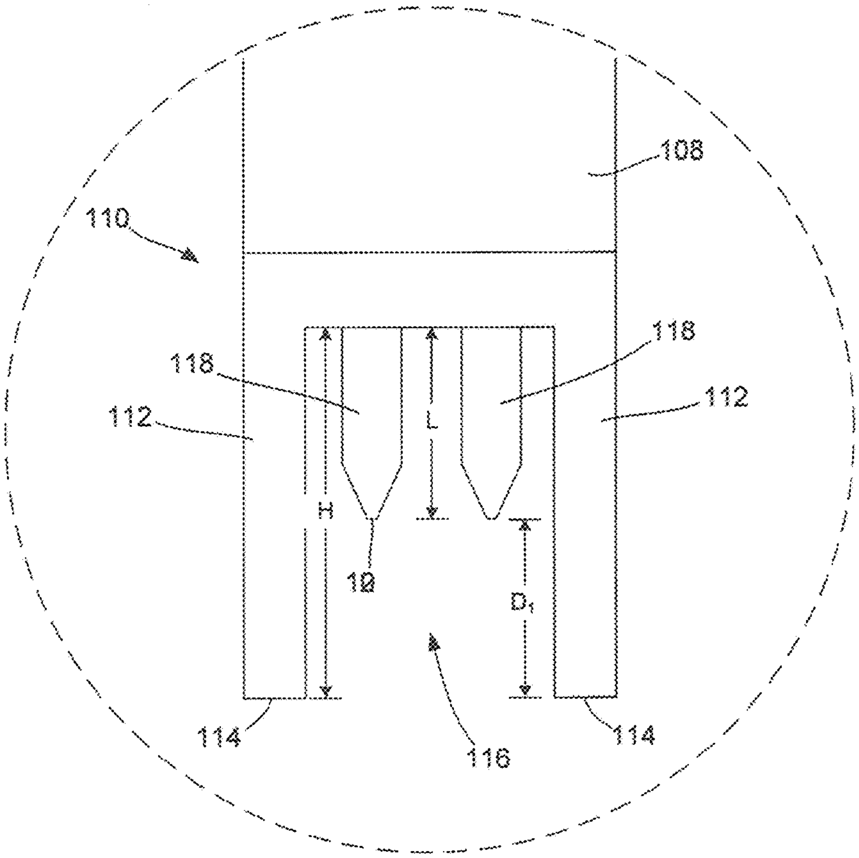
FIG. 3 illustrates an enlarged front view of the shroud portion of the connector release tool of FIG. 2 consistent with the present disclosure.

Referring to FIG. 3, an enlarged front view of the shroud portion 110 of the connector release tool 100 of FIG. 2 is illustrated. The shroud portion 110 includes sidewalls 112 extending away from the distal end 108 and terminating at a datum surface 114. The sidewalls 112 have a height H and define a channel 116 therebetween. The height H of the sidewalls 112 may vary depending on the dimensions of the terminal block upon which the tool 100 is to be applied, such that a portion of the terminal block may be received within the channel 116 (shown in FIGS. 5A and 5B). In one embodiment, the height H of the sidewalls 112 is approximately 0.220 inches.

The shroud portion 110 further includes one or more contact pins 118 extending away from the distal end 108 and into the channel 116. The contact pins 118 may have a length L. Similar to the sidewalls 112, dimensions (e.g. length L) of the contact tips 118 may vary depending on the dimensions of the terminal block upon which the tool 100 is to be applied. In one embodiment, the length L of the contact tips 118 is approximately 0.120 inches.

In the illustrated embodiment, the shroud portion 110 includes two contact pins 118. However, it should be noted that the shroud portion 110 may include any number of contact pins (e.g. 1, 3, n) depending on the configuration of the terminal block that the tool 100 is to be applied to. For example, in the following description, the terminal block that the tool 100 is to be applied to is of a 2-pole configuration, and, as such, includes two push-button connectors for two wire conductors (as shown in FIG. 1). Accordingly, the shroud portion 110 includes two contact pins 118 adapted to engage the two push-button connectors. However, a shroud portion consistent with the present disclosure may include three contact pins, for example, so as to engage a terminal block having a 3-pole design and including three push-button connectors.

Figure 5A:
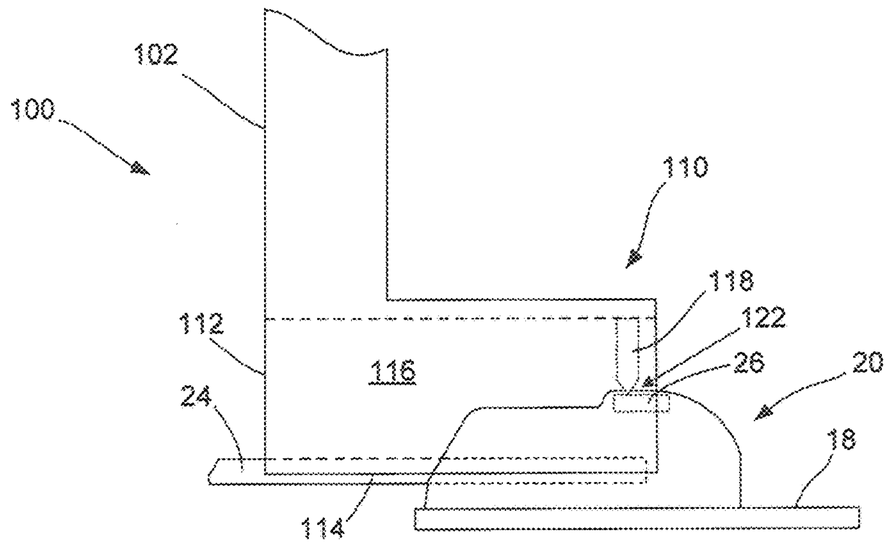
FIGS. 5A and 5B illustrate side views of the connector release tool of FIG. 2 engaging a surface-mount terminal block and allowing simultaneous release of at least two wire conductors coupled to the terminal block.
Figure 5B:
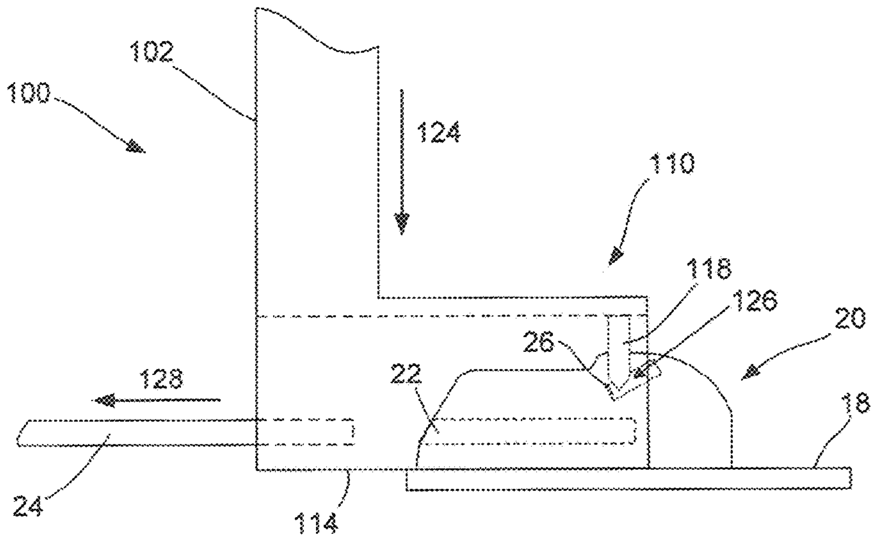

As shown, each contact pin 118 defines a tip portion 120 positioned within the channel 116 and a distance $D_1$ from the datum surface 114 of the sidewalls 112. The tip portions 120 are adapted to contact an associated push-button connector 26 of the terminal block 20 (as shown in FIGS. 5A and 5B). Similar to the dimensions of the sidewalls 112 and contact tips 118, the distance $D_1$ between the tip portions 120 and datum surface 114 may vary depending on the dimensions of the terminal block upon which the tool 100 is to be applied. In one embodiment, the distance $D_1$ is approximately 0.100 inches. As described in greater detail herein, the distance $D_1$ generally defines a positive stop that restricts the overall movement of the connector release tool 100 during engagement and operation with a terminal block so as to prevent damage.

Figure 4:
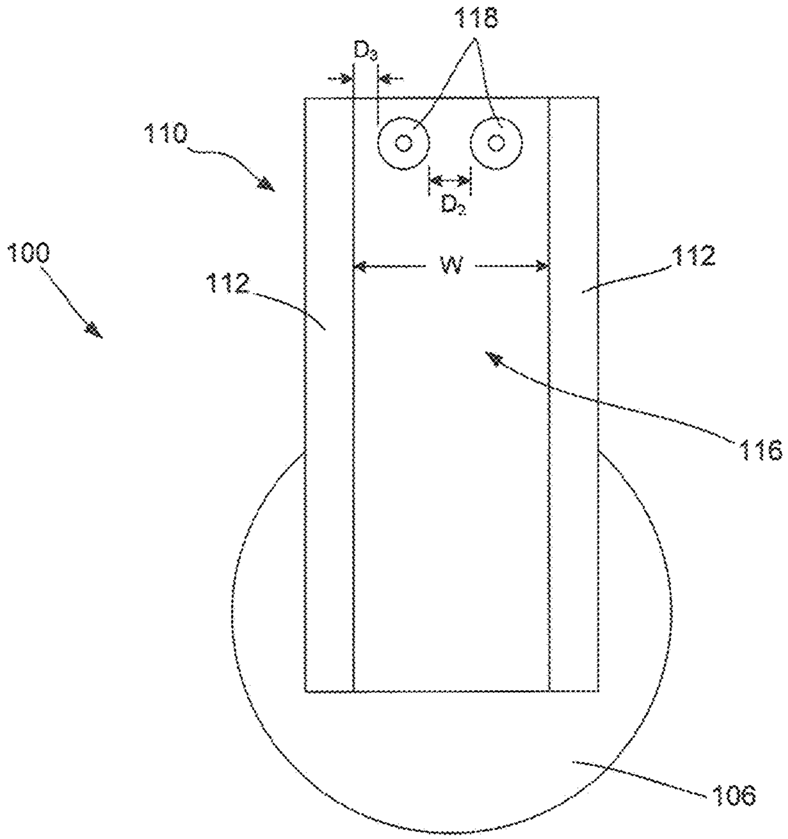
FIG. 4 illustrates a bottom view of the shroud portion of the connector release tool of FIG. 2 consistent with the present disclosure.

FIG. 4 illustrates a bottom view of the shroud portion 110 of the connector release tool 100 of FIG. 2. As shown, the channel 116 includes a width W defined between sidewalls 112. The width W may vary depending on the dimensions of the terminal block upon which the tool 100 is to be applied. In one embodiment, the width W may be sufficient to allow at least a portion of the terminal block to be received within the channel 116. The contact pins 118 may be spaced a distance $D_2$ apart from one another and each contact pin 118 may be spaced a distance $D_3$ away from an adjacent sidewall 112. The distances $D_2$ and $D_3$ generally correspond to the dimensions of the push-button connectors 26 of the terminal block 20, such that the contact pins 118 generally align with associated push-button connectors 26 when the shroud portion 110 is positioned over the terminal block 20. In one embodiment, distances $D_2$ and $D_3$ are approximately 0.165 inches and 0.085 inches, respectively.

FIGS. 5A and 5B illustrate side views of the connector release tool 100 of FIG. 2 engaging a surface-mount terminal block 20. Referring to FIG. 5A, the shroud portion 110 of the tool 100 may be positioned over a portion of the terminal block 20, such that the terminal block 20 is at least partially received within the channel 116. Due to the dimensions of the sidewalls 112, contact pins 118 and channel 116 (e.g. height H, length L, width W and distances $D_1$-$D_3$), the shroud portion 110 is adapted to align each of the contact pins 118 with associated push-button connectors 26 of the terminal block 20. As shown, the contact pins 118 are able to make contact with associated push-button connectors 26, as indicated by arrow 122.

Referring to FIG. 5B, upon application of a force towards the terminal block 20, as indicated by arrow 124, each contact pin 118 engages and depresses the associated push-button connector 26, as indicated by arrow 126. As such, the tool 100 allows simultaneous depression of multiple push-button connectors (e.g. two push-button connectors in this embodiment), thereby releasing contact with the two wire conductors 24 and allowing simultaneous removal of each, as indicated by arrow 128. Furthermore, as the user applies force to the push-button connectors 26, the datum surface 114 will eventually abut the surface of the PCB 18, thereby restricting overall movement of the tool 100 in relation to the terminal block 20. More specifically, the positive stop, defined by the distance $D_1$ between the tip portions 120 of the contact pins 118 and the datum surface 114 of the sidewalls 112, allows the push-button connectors 26 to be sufficiently depressed by the contact pins 118 (i.e. sufficient to release contact connection with associated wire conductors 24) without being over depressed, thereby preventing a user from applying excess pressure on the terminal block 20 and causing damage.

Figure 6:
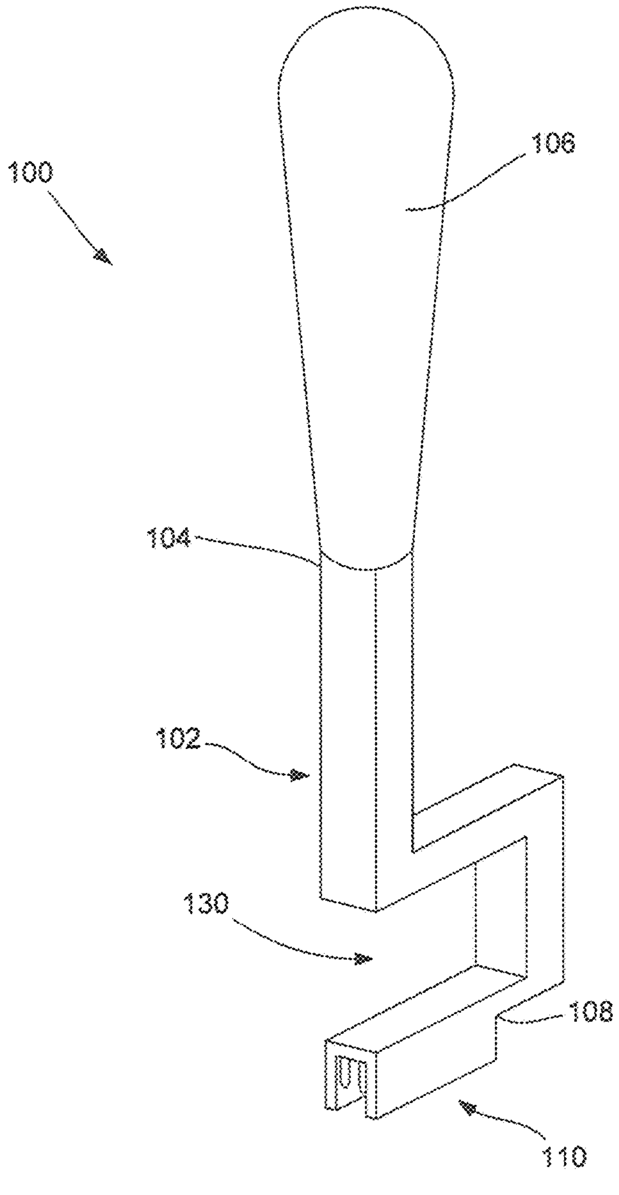
FIG. 6 illustrates the connector release tool of FIG. 2 including an alternative embodiment of a shaft consistent with the present disclosure.
Figure 7:
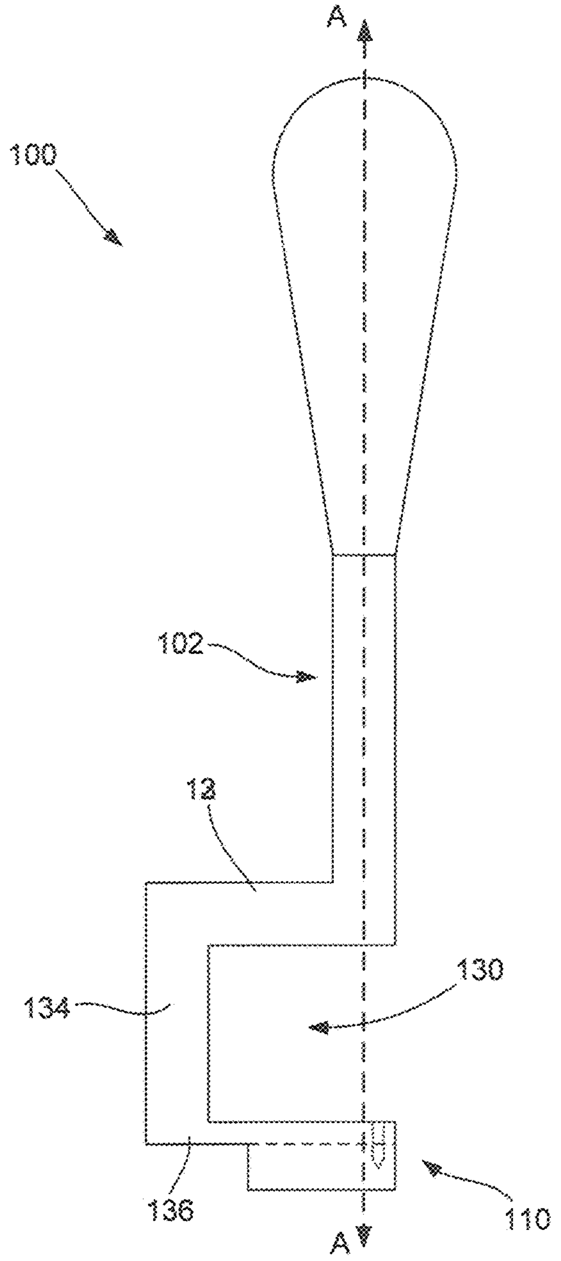
FIG. 7 illustrates a side view of the connector release tool of FIG. 2.

FIGS. 6 and 7 illustrate perspective and side views of the connector release tool 100 of FIG. 2 including an alternative embodiment of a shaft 102 consistent with the present disclosure. As shown, the shaft 102 further includes a lateral clearance portion 130 formed along a longitudinal axis A thereof. The lateral clearance portion 130 includes a first reentrant portion 132 bending in a direction away from the longitudinal axis A, a second reentrant portion 136 bending in a direction towards the longitudinal axis A and a jog portion 134 coupled between the first and second reentrant portions 132, 136. In the illustrated embodiment, the lateral clearance portion 130 has a generally rectangular shape. However, it should be noted that the lateral clearance portion 130 may have a variety of different shapes and dimensions depending on the particular application.

The lateral clearance portion 130 is generally shaped and/or sized to provide clearance for one or more components that may be surrounding and/or adjacent to the terminal block 20 or portions thereof. For example, some lighting systems may include a lens or cover positioned above an LED(s), circuitry, PCBs and/or terminal block(s) that would otherwise require partial or complete remove so as to gain access to the terminal block for reworking. Accordingly, a lateral clearance portion consistent with the present disclosure may be shaped and/or sized to accommodate such components without requiring removal to engage the terminal block, thereby saving time and energy during reworking of the lighting system.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The following is a non-limiting list of reference numerals used in the specification:

10 prior art operating tool
12 shaft of operating tool
14 handle of operating tool
16 operative distal end of operating tool
18 printed circuit board (PCB)
20 surface mount PCB terminal block
22 input ports
24 wire conductors
26 push buttons
28 downward force of operating tool upon push button
30 removal of wire conductor upon release from port
100 connector release tool
102 shaft of tool
104 proximal end of shaft
106 handle portion
108 operative distal end of shaft
110 shroud portion
112 sidewalls of shroud portion
114 datum surface of sidewalls
116 channel defined between sidewalls
118 plurality of contact pins
120 tip portions of contact pins
122 contact between tip portion of contact pin and push button of terminal block
124 downward force of connector release tool upon terminal block
126 depression of push button
128 removal of wire conductor from port
130 lateral clearance formed in shaft of tool
132 first reentrant portion of lateral clearance
134 jog portion of lateral clearance
136 second reentrant portion of lateral clearance
A longitudinal axis of shaft of connector release tool
$D_1$ distance from tip portion of contact pin to sidewall datum surface
$D_2$ distance between contact pins
$D_3$ distance between sidewall and contact pin
H height of sidewall
L length of contact pin
W width of channel of shroud portion

What is claimed is:

1. A connector release tool (100) comprising:

a shaft (102) having a proximal end (104) and an operative distal end (108), said proximal end (104) defining a handle portion (106), and said operative distal end (108) adapted to engage a terminal block (20) and allow removal of one or more wires (24) coupled to said terminal block (20), said distal end (108) comprising:

a shroud portion (110) having sidewalls (112), said sidewalls (112) extending away from said distal end (108) and terminating at a datum surface (114), and said sidewalls (112) further defining a channel (116) therebetween; and a plurality of contact pins (118) extending away from said distal end (108) and into said channel (116) of said shroud portion (110), each contact pin (118) defining a tip portion (120) positioned within said channel (116) and a distance ($D_1$) from said datum surface (114) of said sidewalls (112), and each contact pin (118) further adapted to contact an associated push-button connector (26) of said terminal block (20).

2. The tool of claim 1, wherein said shroud portion (110) is adapted to align each of said contact pins (118) with associated push-button connectors (26) of said terminal block (20).

3. The tool of claim 1, wherein, upon application of a force towards said terminal block (20), each contact pin (118) engages and depresses said associated push-button connector (26) to allow removal of the one or more corresponding wires (24) coupled thereto and said datum surface (114) of said sidewalls (112) abuts a substrate (18) on which said terminal block (20) is mounted and restricts overall movement of said tool (100) in relation to said terminal block (20).

4. The tool of claim 1, wherein said plurality of contact pins (118) comprises two contact pins (118).

5. The tool of claim 1, wherein said plurality of contact pins (118) comprises three contact pins.

6. The tool of claim 1, wherein said shaft (102) further includes a lateral clearance portion (130) formed along a longitudinal length thereof, said lateral clearance portion (130) being shaped and sized to provide clearance for one or more components surrounding said terminal block (20).

7. The tool of claim 1, wherein at least a portion of said tool (100) is coated in an electrical insulating material.

* * * * *